United States Patent [19]

Logan et al.

[11] 4,167,598

[45] Sep. 11, 1979

[54] HEAT AND SOUND INSULATING PANEL

[76] Inventors: Paul A. Logan, 3404 Middlesex Dr., Apt. E, Toledo, Ohio 43606; Robert C. Olivero, 123 Saunders St., Dalzell, Ill. 61320; William C. Olivero, 123 Saunders St., Dalzell, Ill. 61320; Carlo Olivero, 123 Saunder St., Dalzell, Ill. 61320

[21] Appl. No.: 799,978

[22] Filed: May 24, 1977

[51] Int. Cl.² .................. B32B 1/08; B32B 3/30
[52] U.S. Cl. .................. 428/35; 52/144; 52/785; 181/288; 181/290; 428/166; 428/172; 428/178; 428/189
[58] Field of Search .............. 428/72, 116, 118, 178, 428/179, 189, 183, 920, 921, 184, 166; 181/33 G, 286, 288, 290–293; 156/197, 210; 52/407, 615, 144

[56] References Cited

U.S. PATENT DOCUMENTS

| 798,804 | 9/1905 | Kunz | 428/178 |
|---|---|---|---|
| 3,086,899 | 4/1963 | Smith et al. | 428/178 |
| 3,341,395 | 9/1967 | Weber | 428/76 |
| 3,501,878 | 3/1970 | Segal | 181/290 |

Primary Examiner—George F. Lesmes
Assistant Examiner—P. Thibodean
Attorney, Agent, or Firm—Browdy and Neimark

[57] ABSTRACT

A heat and sound insulating panel assembly for wall, ceiling or floor construction consists of a plurality of interlocking vacuum-chambered panel elements fabricated from a relatively hard, low thermally-conductive, fire-resistant or fireproof material with heat-reflective, moisture-restraining coatings on its inner and outer surfaces. Abutting surfaces may be provided with sound-cushioning pads, and vacuum-chambered spacer column elements may be employed, interlocked between panel elements, for uniform increased panel wall thickness.

8 Claims, 9 Drawing Figures

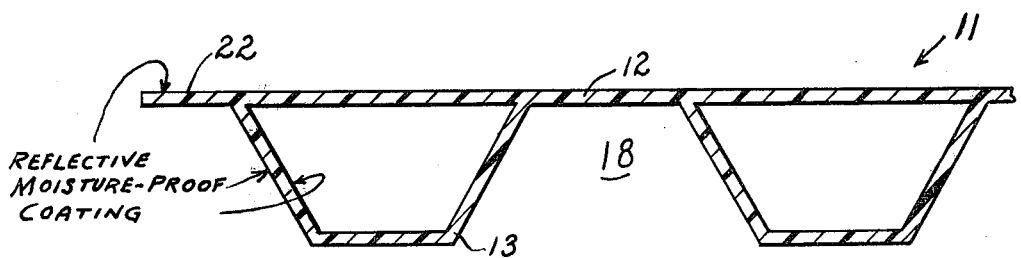
FIG. 1
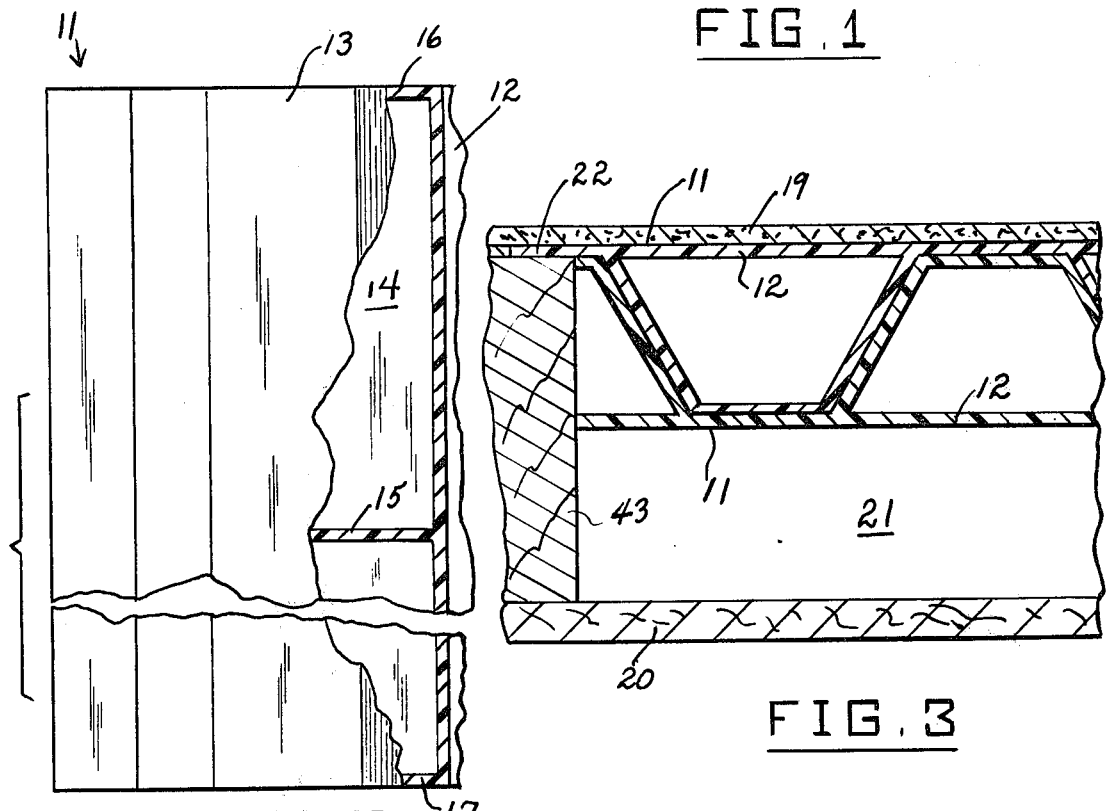
FIG. 2
FIG. 3
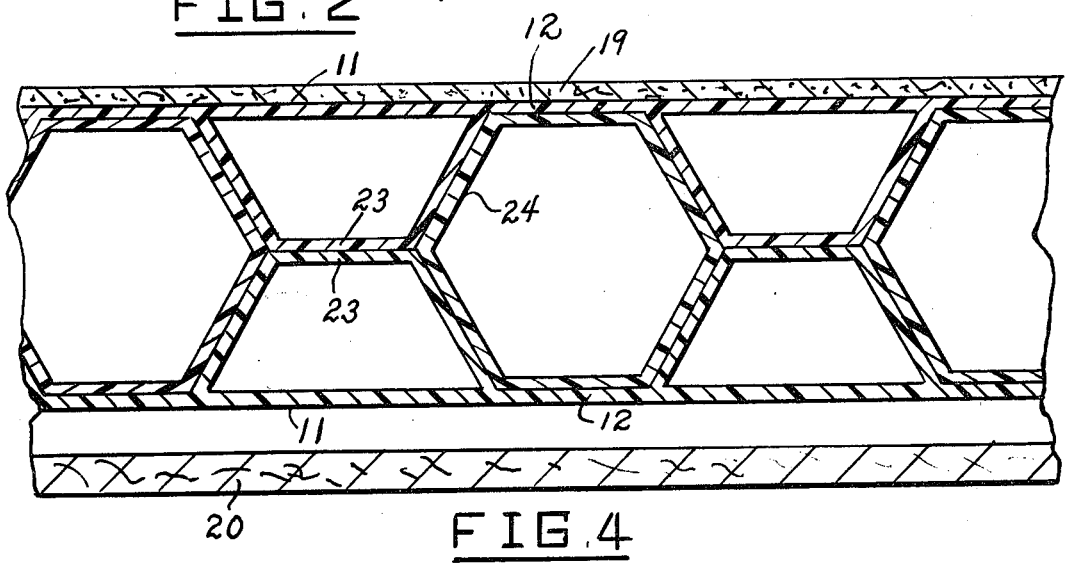
FIG. 4

HEAT AND SOUND INSULATING PANEL

FIELD OF THE INVENTION

This invention relates to building panel assemblies, and more particularly to heat and sound insulating panels which retard heat flow either inwardly or outwardly and which also act as sound insulation.

BACKGROUND OF THE INVENTION

In the prior art relating to the construction of buildings, vehicles, and other types of enclosures where control of heat flow and sound transmission is important, various structural arrangements have been proposed for dealing with these factors. Laminated panels with spaced parallel portions for forming dead air spaces have been employed. Also, interlocking modules with hollow sections have been proposed. Hollow glass building blocks have been widely employed in wall structures. Vacuum cells or building blocks have been likewise proposed for constructing an insulating wall.

In general, the previously proposed structures have been relatively expensive, excessively heavy, difficult to install, inefficient in insulating properties, and relatively weak in strength, so that there is a definite need for an improved construction for accomplishing the required purposes, mainly with respect to providing satisfactory heat and sound insulation at low cost.

There is also a need for energy conservation in general, and important programs are under way to develop fuel-conserving walls, ceilings and floors for new buildings as well as for the modification of existing buildings to reduce their fuel requirements under cold weather conditions and to facilitate and reduce the energy costs for cooling the buildings by air conditioning equipment under hot weather conditions. Along with this need are requirements for reduction of fire hazards, restraint against the entry of or penetration by moisture, and protection against the infiltration of vermin and rodents.

A preliminary search of the prior art discloses the following prior U.S. patents, which appear to represent the present state of the art: Walzel, U.S. Pat. No. 896,780 Palmer, U.S. Pat. No. 2,049,863 Keaney, U.S. Pat. No. 2,086,185 Snipischki, U.S. Pat. No. 2,211,177 Weber, U.S. Pat. No. 3,341,395 Weiss, U.S. Pat. No. 3,798,861

SUMMARY OF THE INVENTION

Accordingly, a main object of the present invention is to provide improved heat and sound insulating material which provides efficient and economical heating and cooling source utilization by the creation of an adiabatic heat flow-retarding and sound insulating condition within the ceilings, walls, floors and analogous components of enclosures including, buildings, appliances, aircraft bodies, door constructions, automobile walls, and any other structures necessitating such insulation characteristics.

A further highly important object of the present invention is to provide a novel and improved insulating material which is heat and sound insulating, moisture-restraining, and vermin-proof, and which provides for easy installation and increased protection from fire hazards.

A still further object of this invention is to provide an improved light-weight rigid supporting element for wall, ceiling, floor, and similar structures, which is easily adaptable for prefabrication techniques and incorporable into interior and exterior building assemblies as interior paneling and exterior siding.

A still further object of this invention is to provide improved panel structures for a building or enclosure permitting easy installation of electrical wiring through said building or enclosure and allowing for a wide range of building or structure wall depths.

A still further object of this invention is to provide panel structures for buildings which maximize health safety to occupants of the buildings by the use of non-toxic, fiberless, and highly insulating material for said panel structures.

BRIEF DESCRIPTION OF THE DRAWINGS

Further objects and advantages of the invention will become apparent from the following description and claims, and from the accompanying drawings, wherein:

FIG. 1 is a fragmentary horizontal cross-sectional view taken through an improved panel element according to the present invention.

FIG. 2 is a fragmentary elevational view, partly in cross-section, of a part of the panel element of FIG. 1.

FIG. 3 is a fragmentary horizontal cross-sectional view taken through a portion of a building wall employing interlocked panel elements according to FIGS. 1 and 2.

FIG. 4 is a fragmentary horizontal cross-sectional view taken through a portion of another building wall structure employing opposing panel elements according to FIGS. 1 and 2 and vacuum-celled filler column elements interlocked with the opposing panel elements, in accordance with the present invention.

DESCRIPTION OF PREFERRED EMBODIMENTS

Figure 5:
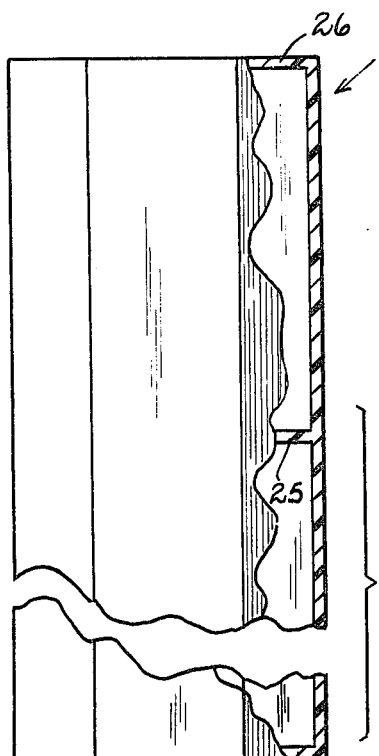
FIG. 5 is a fragmentary elevational view, partly in cross-section, of a filler column element as employed in FIG. 4.

Referring to the drawings, and more particularly to FIGS. 1 and 2, a typical panel element 11 forms a basic component of a panel assembly according to the present invention. The panel element 11 comprises a flat main wall 12 integrally formed with a plurality of vertical, spaced parallel, substantially isosceles trapezoidal-cross-section chambers 13′, and as viewed in FIG. 2, further divided into cells 14 by horizontal partition walls 15. The cells 14 are evacuated by suitable means and are sealed. The chambers 13 are provided with top and bottom walls 16, 17. The exposed surfaces of the panel element 11 are silvered to define reflective, moisture-proof coatings.

Panel element 11 is formed of suitable relatively rigid, low thermally conductive, fire-resistant or fireproof material, such as polytetrafluoroethylene, which is sold under the trademark Teflon, cellulose acetate butyrate, fiberglass, or the like.

The trapezoidal vertical chambers 13 are spaced apart to define vertical trapezoidal grooves 18 with a cross-sectional shape substantially identical to that of the chambers 13 so that the vertical chambers 13 of one panel element 11 may be nestingly received in the vertical grooves 18 of a mating panel element 11 in the manner shown in FIG. 3. Thus, FIG. 3 shows a typical wall assembly section utilizing a pair of panel elements 11 in mating interlocking relation, with the flat main wall 12 of the inner panel element located adjacent the inside, or "hot wall" layer 19 of the building wall, and with the flat main wall 12 of the outer panel element 11 spaced from the outside, or "cold wall" layer 20 to define a dead air space 21. The end flanges 22 of the inner panel element overlie and may be suitably secured to the adjacent vertical studs 43.

The interlocking of the panels 11, 11 in combination with their reflective surfaces and the dead air spaces 21 provides maximum insulation from the "cold water" 20 and interior insulation to the "warm wall" 19. The provision of lip flanges 22 greatly facilitates the installation by enabling the inner panel elements to be easily secured to the adjacent wall studs.

The provision of cell-defining horizontal partitions 15, which is optional, maintains the basic integrity of the assembly, since if one of the cells is punctured and its vacuum is lost, the remainder of the assembly will still maintain substantial effectiveness.

FIG. 4 illustrates another interlocking assembly according to the present invention, providing greater depth. In this arrangement the inner and outer panels 11 are in opposing relationship with their central face elements 23, 23 in abutment, thereby defining substantially hexagonal column spaces between the vertical abutting chambers. Evacuated hexagonal-cross-section vertical column spacers 24 are employed as fillers for said vertical hexagonal column spaces, the spacers 24 being of the same insulating material as the panel elements 11, 11. The arrangement of FIG. 4 provides an insulating vacuum-celled layer of approximately twice the depth of that shown in FIG. 3.

As shown in FIG. 5, the hexagonal vertical columnar spacers 24 may be provided with horizontal partition walls 25 to provide a multicellular structure. Each spacer 24 has a top wall 26 and a bottom wall 27, which are respectively flush with the top and bottom walls 16, 17 of the adjacent panel elements 11, 11.

Figure 6:
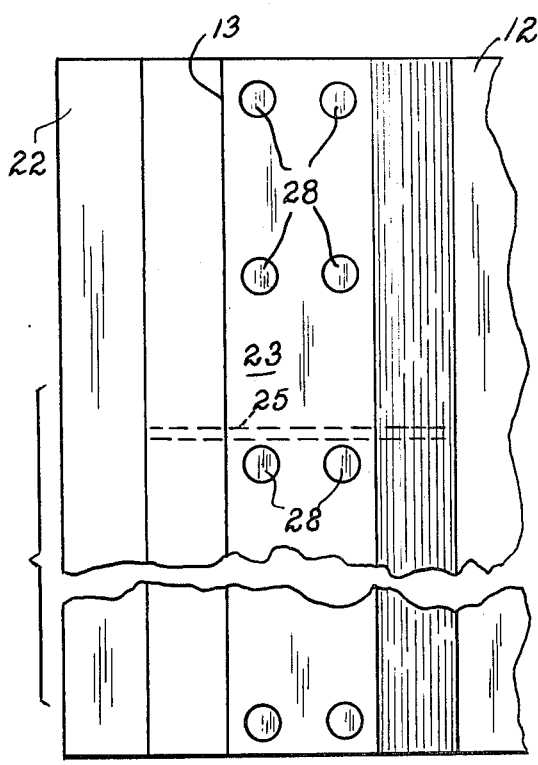
FIG. 6 is a fragmentary elevational view of part of a panel element according to FIG. 1 provided with sound-cushioning pads, in accordance with the present invention.
Figure 7:
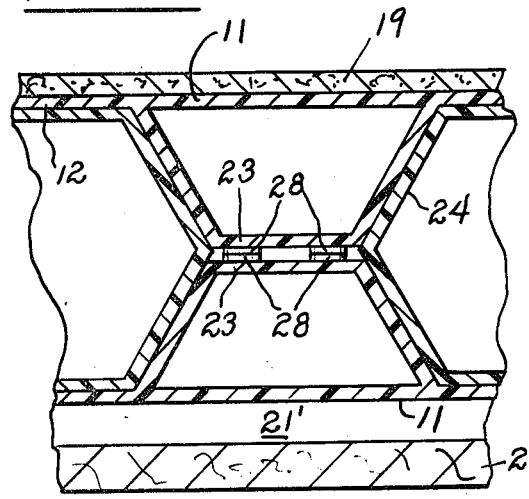
FIG. 7 is a fragmentary horizontal cross-sectional view taken through an interlocked wall panel assembly similar to FIG. 4 but employing the sound-cushioning pads, as in FIG. 6, on the abutting faces of the opposing main panel elements.

As shown in FIG. 6, the abutting face portions 23 may be each provided with a plurality of similarly distributed soundcushioning pads 28, of rubber, or the like, which are in abutting relationship in the assembly, as illustrated in FIG. 7. Thus, dead air in the space 21' is trapped against the "cold wall" 20 because of the interlocked insulating assembly, and sound transmission is limited by the provision of the abutting sound-cushioning pads on the inner face elements 23 of the panel members 11.

Vacuum integrity of the cells of the insulating assembly may be insured by employing suitable adhesive material between the abutting surfaces of the components of the insulating assembly.

Figure 8:
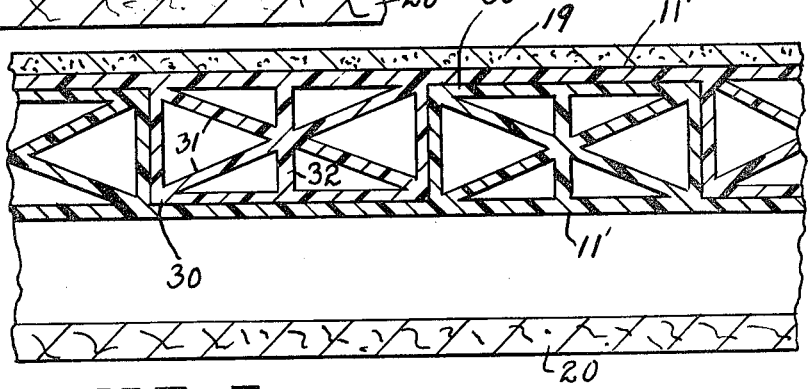
FIG. 8 is a fragmentary horizontal cross-sectional view taken through an interlocked wall panel assembly broadly similar to that of FIG. 3, but employing substantially externally rectangular vacuum cell configurations, in accordance with the present invention.

The spaced parallel panel chambers may have any desired geometrical cross-sectional shape suitable for interlocking nesting cooperation. Thus, as shown in FIG. 8, in the vertical wall structure illustrated in interlocked inner and outer panel elements, shown at 11', 11', are formed with vertically spaced parallel chambers 30 of rectangular cross-section, spaced to interlock with each other, with the chambers of one panel element nestingly received in the grooves defined between the chambers of the mating panel element.

The vertical chambers may be provided internally with horizontal partition walls, as in the previously described embodiments, and also may be provided with diagonal and transverse partition walls 31, 32 to define multiple vacuum cells in the various levels of the regions defined by the horizontal partition walls, thereby greatly increasing the number of independent vacuum cells in the panel members 11'.

Figure 9:
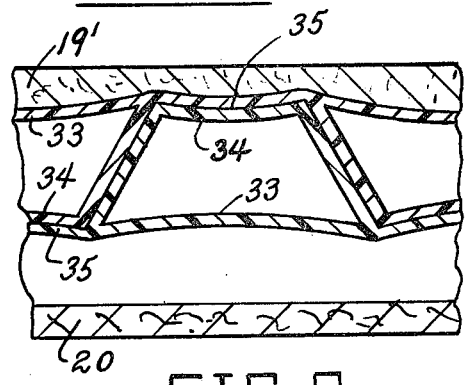
FIG. 9 is a fragmentary horizontal cross-sectional view taken through another interlocked wall panel assembly broadly similar to that of FIG. 3, but having curved reflective surfaces to act as radiation-directing members, in accordance with the present invention.

FIG. 9 illustrates an insulating wall assembly generally similar to that of FIG. 3, except that the opposing wall elements 33,34 of the vertical chambers and the intervening web portions 35 between the vertical chambers are conformably arcuately curved, for example, with parabolic curvature, to facilitate reflection of radiant energy impinging on the insulating panel assembly toward predetermined areas. The "hot wall" 19' may comprise plaster or other interior wall material, covering the inwardly facing portions of the interlocked insulating panel assembly.

The dimensions of the insulating panel elements and the chambers and spacings therebetween may be varied as desired, and the insulating material of the panel elements may be varied over a range of choices of materials of suitable physical properties, and the reflective, moisture-proof coating employed may be of any suitable reflective durable material.

While certain specific embodiments of heat and sound insulating panel structures have been disclosed in the foregoing description, it will be understood that various modifications within the scope of the invention may occur to those skilled in the art. Therefore it is intended that adaptations and modifications should and are intended to be comprehended within the meaning and range of equivalents of the disclosed embodiments.

What is claimed is:

1. An insulating structural wall supporting panel assembly comprising a pair of vertical panel elements of heat insulating material each having a main plate-like body portion formed with a plurality of spaced, hollow, elongated, sealed vertical chambers projecting from the plane of the main body portion and extending continuously for the full height of the assembly parallel to said body portion and to one another, said elongated sealed chambers being evacuated, and means interlockingly joining said panel elements, with said body portions in spaced parallel relationship, with said vertical evacuated chambers extending inwardly from said body portions, and with the evacuated chambers of the respective panel elements extending parallel and in surface abutment with each other, and wherein the elongated vertical evacuated chamber have inner face portions and wherein the inner face portions of the elongated vertical evacuated chambers of the respective panel elements are in surface abutting contact, and wherein said interlockingly joining means comprises vertical column-defining filler members of insulating material conformably interfitting with the spaces between the successive abutting inner face portions of the vertical elongated chambers.

2. The panel assembly of claim 1 and wherein the elongated chambers are substantially trapezoidal in cross-section taken along their lengths and said filler members are elongated members substantially hexagonal in cross-section along their lengths and are dimensioned to closely interfit with the adjacent trapezoidal vacuum chambers.

3. The panel assembly of claim 2, and wherein said elongated filler members are hollow.

4. The panel assembly of claim 3, and wherein said elongated hollow filler members are evacuated.

5. The panel assembly of claim 2, and resilient deformable sound cushioning pad means interposed between the abutting inner face portions of the evacuated chambers.

6. The panel assembly of claim 1, and reflective, moisture-restraining coating material on the outside surfaces of the panel elements.

7. The panel assembly of claim 6 and comprising means for directing reflected radiant energy wherein the main body portions of the panel elements are locally arcuately curved with substantially parabolic curvature for said directing reflected radiant energy.

8. The panel assembly of claim 1, and vertically spaced partition means disposed along and across the widths in said evacuated, chambers, defining a plurality of independent evacuated cells in the vertical elongated chambers.

* * * * *